UNITED STATES PATENT OFFICE 2,465,883

PRODUCTION OF DYESTUFF INTERMEDIATES

John David Kendall and Frank Peter Doyle, Ilford, England, assignors to Ilford Limited, Ilford, England, a British company No Drawing. Application July 1, 1946, Serial No. 680,824. In Great Britain July 3, 1945

6 Claims. (Cl. 260—240)

This invention relates to dyestuff intermediates.

In co-pending U. S. application Serial No. 680,822 filed July 1, 1946, processes are described for the production of compounds of the general formula as follows:

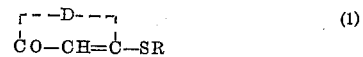 (1)

where R is an alkyl or aralkyl group and D is a chain of three methylene groups any of which may be hydrocarbon-substituted. Such compounds may be defined as $\Delta^{2:3}$-[3-alkyl (or aralkyl) thio] cyclohexenone (1) compounds. The monothio ether compounds of the above Formula 1 are made as described in the above application by reacting a cyclic 1,3-diketone of the general formula

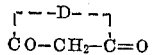

wherein D has the same significance as in the Formula 1 with an alkyl, aryl, or aralkyl mercaptan (RSH) in the presence of a strong acid, e. g., dry hydrochloric acid, nitric acid, sulphuric acid, phosphoric acid, or strong organic acids, e. g., p-toluene sulphonic acid.

In carrying out the reaction one molecular equivalent of the cyclic ketone is treated with preferably not less than two molecular equivalents of mercaptan; a considerable excess of mercaptan may be present and function as a solvent. The quantity of the strong acid is not critical, but generally at least one molecular equivalent of a dibasic acid or at least two molecular equivalents of a monobasic acid may be employed.

It it preferred to keep the reaction mixture as dry as possible. A solvent for the reactants may be present, e. g., benzene, toluene or a lower alcohol, or an ether, for example, diethyl ether. The reaction proceeds at normal room temperature and there is no necessity to heat the reaction mixture.

According to this invention dyestuff intermediates are produced by heating a compound of general Formula 1 with (A) an alkyl or aralkyl quaternary salt of a five-membered or six-membered heterocyclic nitrogen compound containing a reactive methylene group in the $\alpha$ or $\gamma$ position to the quaternary nitrogen atom, or (B) with a five-membered heterocyclic nitrogen-keto-methylene compound, in the presence of a non-basic compound which will combine with the mercaptan RSH eliminated in the reaction.

Reaction (A) appears to proceed as shown in the following equation:

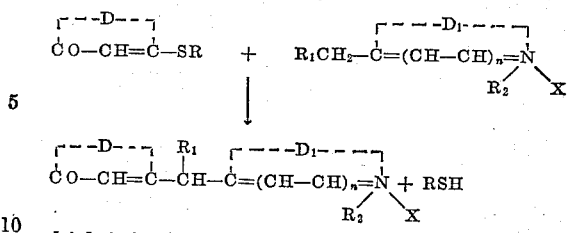

which is tautomeric with

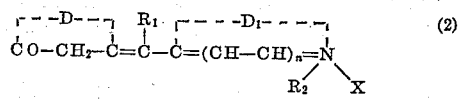 (2)

and reaction (B) appears to proceed as shown in the following equation:

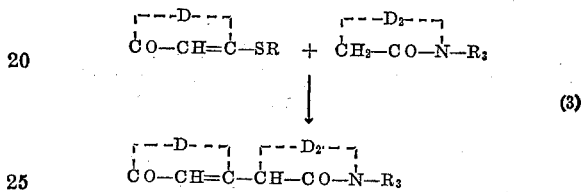 (3)

which is tautomeric with

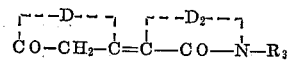

In these formulae R and D have the meanings assigned to them above, $D_1$ is the residue of a five-membered or six-membered heterocyclic nitrogen nucleus, $D_2$ is the residue of a five-membered heterocyclic nitrogen-keto-methylene nucleus, $R_1$ is hydrogen or a hydrocarbon group, $R_2$ is an alkyl or aralkyl group, $R_3$ is hydrogen or a hydrocarbon group, X is an acid radical and $n$ is nought or one.

As indicated above the reactions are effected by heating the reagents together. In case (A) where a quaternary salt is used, it is unnecessary to isolate the quaternary salt and, in fact, a preferred procedure is to react together the heterocyclic nitrogen base, sufficient of an alkyl or aralkyl salt to convert the base to the quaternary salt, and the compound of Formula 1.

The reaction (A) may be applied to all types of five-membered and six-membered heterocyclic nitrogen nuclei. Thus $D_1$ may be the residue of a substituted or unsubstituted thiazole, thiazoline, oxazole, oxazoline, selenazole, selenazoline, pyridine, quinoline, lepidine, indolenine, diazine (e. g. pyrimidine), thiodiazole or quinazoline, or of a corresponding polycyclic compound such as a benzthiazole or naphthathiazole.

The reaction (B) may be applied to all five-membered heterocyclic nitrogen-keto-methylene compounds: examples are rhodanic acid, oxarhodanic acid (and their N-hydrocarbon substituted analogues), oxindoles, pyrazole-5-ones, hydantoin, pseudohydantoin, thiohydantoin and pseudothiohydantoin.

The group R is preferably a lower alkyl group, e. g. methyl or ethyl, as this makes for greater ease of reaction. The group $R_1$, if not a hydrogen atom, is preferably a lower alkyl group, though it may be a higher alkyl or aralkyl or aryl group. The group $R_2$ may be any alkyl or aralkyl group, e. g. methyl, ethyl, propyl or benzyl, and the group $R_3$ may be any of these alkyl or aralkyl groups or an aryl group, e. g. phenyl or naphthyl. Such alkyl, aralkyl and aryl groups may themselves be substituted; for example $R_2$ may be a $\beta$-hydroxyethyl group.

The residue D may be the simple grouping —$CH_2$—$CH_2$—$CH_2$— or may be any corresponding grouping in which one or more of the hydrogen atoms are substituted by hydrocarbon groups, e. g. methyl, ethyl, propyl, isopropyl, styryl or phenyl.

Typical $\Delta^{2:3}$-(3-alkylthio) cyclohexenone (1) compounds which may be employed are:

$\Delta^{2:3}$-(3-ethylthio-5:5 - dimethyl) cyclohexenone (1)
$\Delta^{2:3}$-(3-ethylthio-5-phenyl) cyclohexenone (1)
$\Delta^{2:3}$-(3-ethylthio-5-methyl) cyclohexenone (1)
$\Delta^{2:3}$-(3-ethylthio) cyclohexenone (1)

and analogous compounds produced by the method of the aforesaid application Serial No. 680,822 from 5-isopropyl-cyclohexane dione (1:3)
4:5:5-trimethyl-cyclohexane dione (1:3)
4-phenyl-5:5-dimethyl-cyclohexane dione (1:3)
5-styryl-cyclohexane dione (1:3)

The reaction is carried out in the presence of a non-basic compound which combines with mercaptan, and it has been found that acid anhydrides, e. g. acetic anhydride, are particularly valuable.

The following examples, in which all parts are by weight, illustrate the invention:

Example 1

Preparation of the intermediate shown in the following formula:

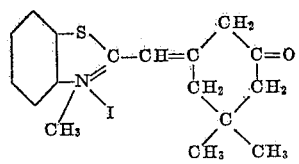

7 parts of $\Delta^{2:3}$-(3-ethylthio-5:5' dimethyl) cyclohexenone (1), 3.7 parts of 1-methyl benzthiazole and 4.7 parts of methyl-p-toluene sulphonate were fused together at 100° C. for 2 hours. 150 parts of acetic anhydride were then added and the mixture refluxed for 1 hour when a deep orange colour had formed. The excess acetic anhydride was removed in vacuo, the residue dissolved in ethyl alcohol and poured into aqueous potassium iodide solution, from which, on cooling, the dyestuff intermediate crystallised. This was removed by filtration and washed with ethyl alcohol and water. It was an orange solid, M. Pt. 191° C.

Example 2

Preparation of the intermediate shown in the following formula:

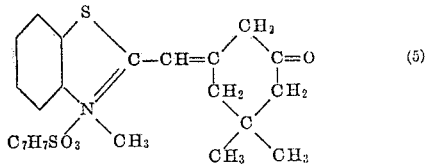

5.96 parts of 1-methyl benzthiazole, 7.44 parts of methyl-p-toluene sulphonate and 7.36 parts of $\Delta^{2:3}$-(3 - ethylthio - 5:5'dimethyl) cyclohexenone (1) were fused at 130–140° for 3 hours. 40 parts of acetic anhydride were added and the whole refluxed for 1 hour. The excess acetic anhydride was evaporated in vacuo and the residue washed with ether and water and then made to crystallise by treatment with acetone and ether. After recrystallisation from ethyl alcohol the product was obtained as an orange solid, M. Pt. 110° C.

Example 3

Preparation of the intermediate shown in the following formula:

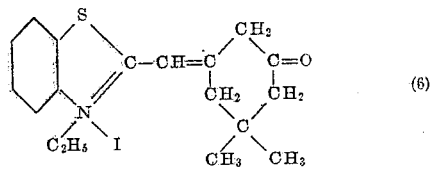

This intermediate was prepared as in Example 1 using the following quantities of reagents: 3.2 parts of $\Delta^{2:3}$-(3-ethylthio-5:5'dimethyl) cyclohexenone (1), 1.5 parts of 1-methyl benzthiazole and 2 parts of ethyl-p-toluene sulphonate. The mixture was fused at 160° for 4 hours. 25 parts of acetic anhydride were added and the mixture refluxed for 2 hours. The product was crystallised from alcohol to give an orange solid, M. Pt. 220° C.

Example 4

Preparation of the intermediate shown in the following formula:

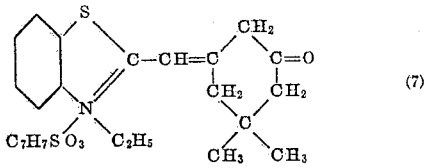

This was prepared as in Example 2 using the following quantities: 7.5 parts of 1-methyl benzthiazole, 10 parts of ethyl-p-toluene sulphonate and 10 parts of $\Delta^{2:3}$-(3-ethylthio-5:5'dimethyl) cyclohexenone (1). The mixture was fused at 160° for 4 hours, 150 parts of acetic anhydride were then added and the mixture boiled as before. The product was an orange solid. M. Pt. 127° C

Example 5

Preparation of the intermediate shown in the following formula:

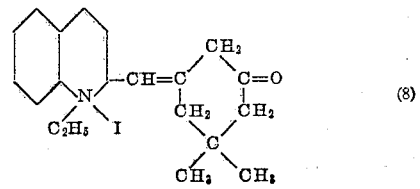

10 parts of Δ²:³-(3-ethylthio-5:5'dimethyl) cyclohexenone (1), 7.2 parts of quinaldine and 10 parts of ethyl-p-toluene sulphonate were fused at 150-160° for 4 hours. 150 parts of acetic anhydride were added and the mixture was boiled for 1 hour, the procedure being as in Example 1. The product, after recrystallisation from ethyl alcohol, was an orange fluffy solid, M. Pt. 164° C.

*Example 6*

Preparation of the intermediate shown in the following formula:

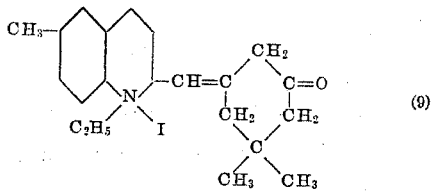

(9)

10 parts of Δ²:³-(3-ethylthio-5:5'dimethyl) cyclohexenone (1), 7.9 parts of p-toluquinaldine, 10 parts of ethyl-p-toluene sulphonate, and 150 parts of acetic anhydride were reacted exactly as in Example 5. The product was a dark orange solid, M. Pt. 210° C.

*Example 7*

Preparation of the intermediate shown in the following formula:

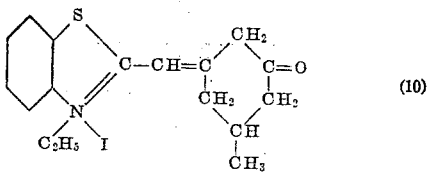

(10)

1.49 parts of 1-methyl benzthiazole and 2 parts of ethyl-p-toluene sulphonate were fused for 3 hours at 140-150°. 1.7 parts of Δ²:³-(3-ethylthio-5-methyl) cyclohexenone (1) were added and the mixture re-fused for 2 hours at 160°. 20 parts of acetic anhydride were then added and the mixture refluxed for 1 hour. The product was isolated and purified as in the previous examples. It was an orange solid, M. Pt. 211° C. (with decomposition).

*Example 8*

Preparation of the intermediate shown in the following formula:

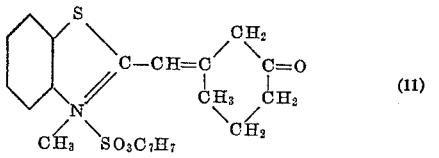

(11)

1.5 parts of 1-methyl benzthiazole, 1.9 parts of methyl-p-toluene sulphonate and 1.6 parts of Δ²:³-(3-ethylthio)-cyclohexenone (1) were fused together at 140-150° for 3 hours. 20 parts of acetic anhydride were added and the whole boiled for 1½ hours. The product was isolated as in Example 2 as a light orange solid, M. Pt. 112° C.

*Example 9*

Preparation of the intermediate shown in the following formula:

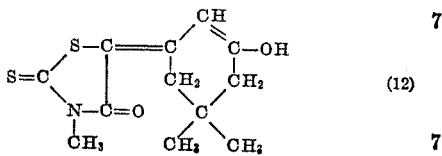

(12)

3.0 gms. of N-methyl rhodanic acid and 3.7 gms. of Δ²:³-(3-ethylthio-5:5'dimethyl) cyclohexenone (1) were fused at 120-130° C. for 2 hours and then boiled for 1 hour with 25 cc. of acetic anhydride. The excess acetic anhydride was evaporated in vacuo and the residue dissolved in a little ethyl alcohol from which, on cooling, the intermediate crystallised. It was removed by filtration and recrystallised from ethyl alcohol when it was obtained as red crystals, M. Pt. 192° C.

*Example 10*

Preparation of the intermediate shown in the following formula:

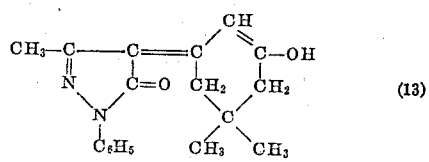

(13)

3.5 gms. of 1-phenyl-3-methyl-5-pyrazolone and 3.7 gms. of Δ²:³-(3-ethylthio-5:5'dimethyl) cyclohexenone (1) were fused at 130-140° C. for 4 hours and then boiled with 25 cc. of acetic anhydride. The intermediate was isolated as in Example 2, recrystallised from ethyl alcohol and further purified by extraction with ether, the intermediate being obtained by evaporation of the ether solution. It was a yellow solid, M. Pt. 110° C.

Many of the dye intermediates produced according to this invention may be condensed as described in co-pending U. S. application Serial No. 680,825 filed July 1, 1946.

What we claim is:

1. Process for the production of dyestuff intermediates which comprises heating a compound of the general formula:

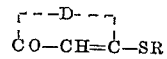

where R is selected from the class consisting of alkyl and aralkyl groups and D is a chain of three methylene groups any of which may be hydrocarbon-substituted, with a compound selected from the class consisting of alkyl and aralkyl quaternary salts of five-membered and six-membered heterocyclic nitrogen compounds containing a reactive methylene group in one of the positions alpha and gamma to the quaternary nitrogen atom and five-membered heteorcyclic nitrogen keto-methylene compounds, the reaction being effected in the presence of a non-basic compound which will combine with the mercaptan (RSH) eliminated in the reaction.

2. Process for the production of dyestuff intermediates which comprises heating a compound of the general formula:

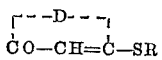

where R is selected from the class consisting of alkyl and aralkyl groups and D is a chain of three methylene groups any of which may be hydrocarbon-substituted, with a compound selected from the class consisting of alkyl and aralkyl quaternary salts of five-membered and six-membered heterocyclic nitrogen compounds containing a reactive methylene group in one of the positions alpha and gamma to the quaternary nitrogen atom and five-membered heterocyclic nitrogen keto-methylene compounds, the reaction being effected in the presence of an acid anhydride.

3. Process for the production of dyestuff intermediates which comprises heating a compound of the general formula:

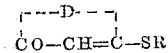

where R is selected from the class consisting of alkyl and aralkyl groups and D is a chain of three methylene groups any of which may be hydrocarbon-substituted, with a compound selected from the class consisting of five-membered and six-membered heterocyclic nitrogen bases containing a reactive methylene group in one of the positions alpha and gamma to the heterocyclic nitrogen atom and with sufficient of a compound selected from the class consisting of alkyl and aralkyl salts to convert the said base to the corresponding quaternary salt, the said reaction being effected in the presence of a non-basic compound which will combine with the mercaptan (RSH) eliminated in the reaction.

4. Process for the production of dyestuff intermediates which comprises heating a compound of the general formula:

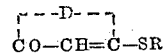

where R is selected from the class consisting of alkyl and aralkyl groups and D is a chain of three methylene groups any of which may be hydrocarbon-substituted, with a compound selected from the class consisting of five-membered and six-membered heterocyclic nitrogen bases containing a reactive methylene group in one of the positions alpha and gamma to the heterocyclic nitrogen atom and with sufficient of a compound selected from the class consisting of alkyl and aralkyl salts to convert the said base to the corresponding quaternary salt, the said reaction being effected in the presence of an acid anhydride.

5. Dyestuff intermediates of the general formula:

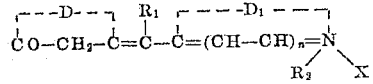

where $R_1$ is selected from the class consisting of hydrogen and hydrocarbon groups, $R_2$ is selected from the class consisting of alkyl and aralkyl groups, D is a chain of three methylene groups any of which may be hydrocarbon-substituted, $D_1$ is a residue selected from the residues of five-membered and six-membered heterocyclic nitrogen nuclei, X is an acid radicle and $n$ is selected from nought and one.

6. Dyestuff intermediates of the general formula:

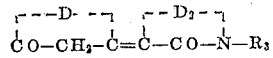

where D is a chain of three methylene groups any of which may be hydrocarbon-substituted, $D_2$ is the residue of a heterocyclic nitrogen ketomethylene nucleus and $R_3$ is selected from the class consisting of the hydrogen atom and hydrocarbon groups.

JOHN DAVID KENDALL.
FRANK PETER DOYLE.

REFERENCES CITED

The following references are of record in the file of this patent:

UNITED STATES PATENTS

| Number | Name | Date |
|---|---|---|
| 2,388,963 | Fry et al. | Nov. 13, 1945 |